(12) United States Patent
Inagaki et al.

(10) Patent No.: US 12,398,787 B2
(45) Date of Patent: Aug. 26, 2025

(54) DRIVE DEVICE

(71) Applicant: HI-LEX CORPORATION, Hyogo (JP)

(72) Inventors: Hiroyuki Inagaki, Hyogo (JP); Ryosuke Moriyama, Hyogo (JP)

(73) Assignee: HI-LEX CORPORATION, Hyogo (JP)

(*) Notice: Subject to any disclaimer, the term of this patent is extended or adjusted under 35 U.S.C. 154(b) by 0 days.

(21) Appl. No.: 17/767,502

(22) PCT Filed: Oct. 23, 2020

(86) PCT No.: PCT/JP2020/039815
§ 371 (c)(1),
(2) Date: Apr. 8, 2022

(87) PCT Pub. No.: WO2021/079964
PCT Pub. Date: Apr. 29, 2021

(65) Prior Publication Data
US 2024/0068548 A1    Feb. 29, 2024

(30) Foreign Application Priority Data
Oct. 23, 2019   (JP) .................................. 2019-192788

(51) Int. Cl.
F16H 25/20 (2006.01)
B60J 5/10 (2006.01)
E05F 15/622 (2015.01)

(52) U.S. Cl.
CPC ................. *F16H 25/20* (2013.01); *B60J 5/10* (2013.01); *E05F 15/622* (2015.01); *F16H 2025/2031* (2013.01)

(58) Field of Classification Search
CPC . F16H 25/20; F16H 2025/2031; E05F 15/622
See application file for complete search history.

(56) References Cited

U.S. PATENT DOCUMENTS

2017/0275939 A1    9/2017  Jun et al.
2019/0277076 A1*   9/2019  Takizawa ................. B60J 5/101

FOREIGN PATENT DOCUMENTS

CN        109577781 A  *  4/2019  ............ E05F 15/622
DE        102017117993 A1    2/2019
(Continued)

OTHER PUBLICATIONS

International Search Report and Written Opinion from PCT/JP2020/039815 dated Dec. 1, 2020.

*Primary Examiner* — Randell J Krug
(74) *Attorney, Agent, or Firm* — Calfee, Halter & Griswold LLP

(57) ABSTRACT

Drive device includes first housing, second housing configured to move relatively with respect to first housing, drive section, spindle member, nut member, moving member, coil spring, and spring guide member. First housing includes inner peripheral surface, housing portion housing drive section, and protruding portion protruding toward the center from inner peripheral surface. Spring guide member includes spring support portion and flange portion protruding outward in the radial direction of spring support portion. Flange portion of spring guide member is held between protruding portion and drive section in the axis X direction of spindle member.

4 Claims, 4 Drawing Sheets

(56) References Cited

FOREIGN PATENT DOCUMENTS

| | | |
|---|---|---|
| JP | 2015-505015 A | 2/2015 |
| JP | 2017-032071 A | 2/2017 |
| JP | 2017-101537 A | 6/2017 |
| JP | 2017-172201 A | 9/2017 |
| JP | 2018-082516 A | 5/2018 |
| JP | 2019-157491 A | 9/2019 |

\* cited by examiner

DRIVE DEVICE

RELATED APPLICATIONS

The present application is a 35 U.S.C. 371 U.S. national stage application entry of PCT International Application No. PCT/JP2020/039815, filed on Oct. 23, 2020 which claims the benefit of Japanese Patent Application No. 2019-192788, filed Oct. 23, 2019, the entire disclosures of which are incorporated herein by reference.

TECHNICAL FIELD

The present invention relates to a drive device.

BACKGROUND ART

As a drive device for allowing a back door or externally opening window of an automobile to pivot, a drive device that performs a telescopic drive is used (see, for example, Patent Literature (hereinafter, referred to as PTL) 1). The drive device of PTL 1 includes a first housing provided at a base such as a vehicle body and a second housing provided at a vehicle door that can move relatively with respect to the first housing.

Such a drive device includes, for example, a drive section such as a motor, a spindle that is rotatably driven by the drive section, a spindle nut that converts the rotational motion of the spindle into axial displacement of the spindle, and a spindle guide tube with which the spindle nut is coupled and which houses a part of the spindle in the inside thereof. Such a drive device further includes a coil spring configured to bias (press) the first and second housings of the drive device in a direction in which the housings are separated from each other.

For the drive device including such a coil spring, a cylindrical spring guide may be provided between the inside of the coil spring and the outer circumference of the spindle nut to prevent a part of the coil spring from contacting the outer circumference of the spindle nut, such as when the coil spring is compressed.

CITATION LIST

Patent Literature

PTL 1
Japanese Patent Application Laid-Open No. 2017-172201

SUMMARY OF INVENTION

Technical Problem

When such a spring guide is provided, the spring guide would move so as to incline with respect to the spindle axis unless the spring guide is firmly fixed to the drive device. On the other hand, when the spring guide is firmly fixed to the drive device, the structure of the fixed portion between the spring guide and the drive device becomes complicated. In addition, providing a fixing member for fixing the cylindrical spring guide from the outside in the radial direction increases the radial dimension of the entire drive device.

An object of the present invention is to provide a drive device which can be kept compact in the radial direction and which can fix a spring guide member with a simple structure.

Solution to Problem

A drive device of the present invention includes: a first housing; a second housing configured to move relatively with respect to the first housing along an extending direction of the first housing; a drive section provided in the first housing; a spindle member to be rotated by driving of the drive section; a nut member screwed with the spindle member; a moving member coupled with the nut member; a coil spring configured to bias the first housing and the second housing in a direction in which the first housing and the second housing are separated from each other; and a spring guide member extending in an axis direction of the spindle member and between an inner circumference of the coil spring and an outer surface of the spindle member. In the drive device, the first housing includes an inner peripheral surface, a housing portion housing the drive section, and a protruding portion protruding toward a center of the first housing from the inner peripheral surface. The spring guide member includes a spring support portion extending along the axis direction of the spindle member to support the coil spring, and a flange portion on a side of one end of the spring support portion, the flange portion protruding more outward in a radial direction of the spring support portion than an outer surface of the spring support portion. The protruding portion of the first housing includes a support portion that directly or indirectly supports one end of the coil spring, an insertion space located inside in the radial direction, and a connecting portion to which the flange portion of the spring guide member is directly or indirectly connected. The insertion space is a space through which the spring support portion of the spring guide member is inserted. The flange portion of the spring guide member is held between the protruding portion and the drive section in the axis direction of the spindle member.

Advantageous Effects of Invention

A drive device of the present invention can be kept compact in the radial direction and a spring guide member can be fixed with a simple structure.

DESCRIPTION OF EMBODIMENTS

Hereinafter, a drive device according to an embodiment of the present invention will be described with reference to the drawings. The embodiments shown below are merely examples, and the drive device of the present invention is not limited to the following embodiments.

Figure 1:
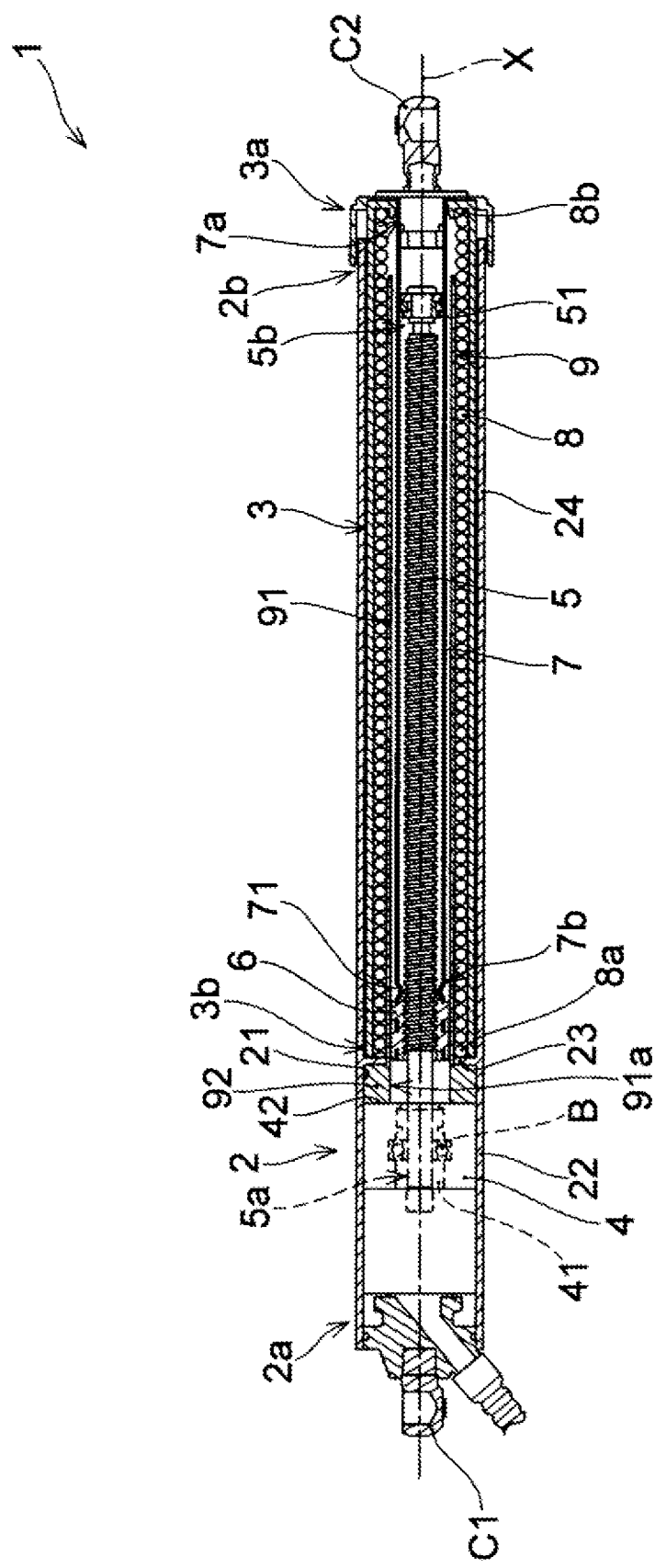
FIG. 1 is a cross-sectional view illustrating a drive device of an embodiment of the present invention cut in the longitudinal direction to show the contracting state of the drive device.
Figure 2:
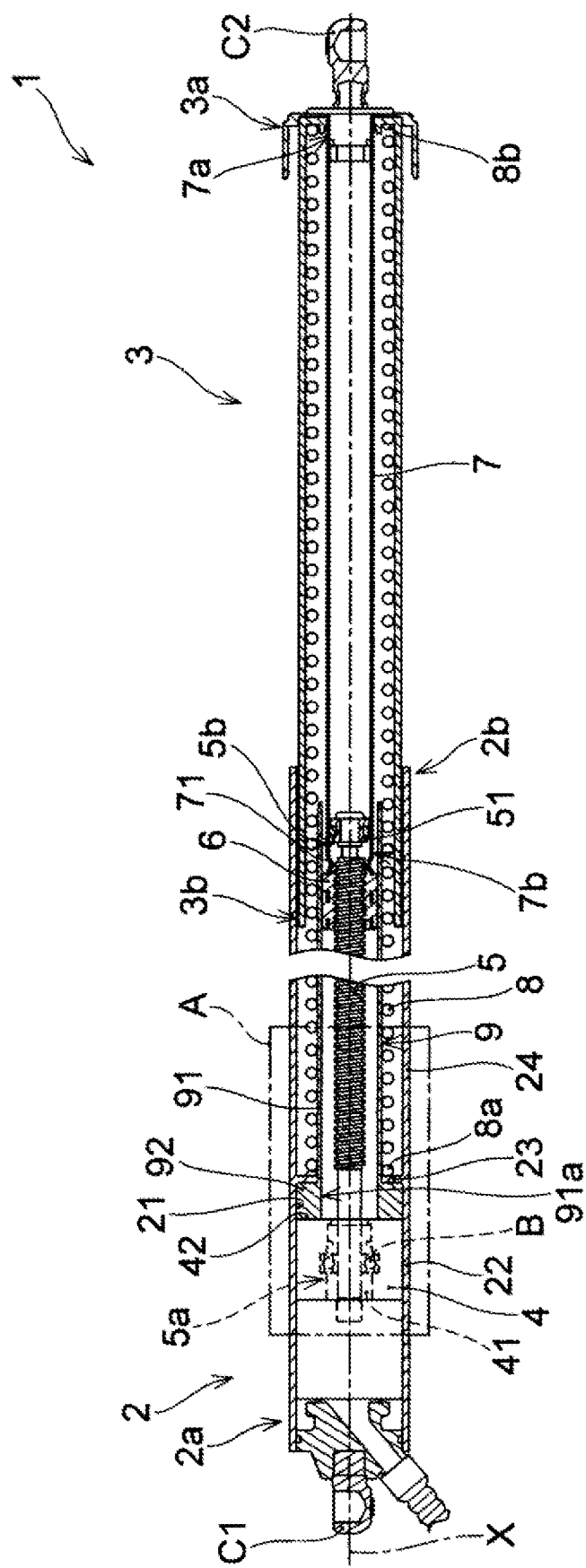
FIG. 2 is a cross-sectional view illustrating the drive device in FIG. 1 cut in the longitudinal direction to show the extending state of the drive device.

As illustrated in FIGS. 1 and 2, drive device 1 of the present embodiment includes first housing 2; second housing 3 configured to move relatively with respect to first housing 2 along the extending direction of first housing 2; drive section 4 provided in first housing 2; spindle member 5 to be rotated by driving of drive section 4; nut member 6 screwed with spindle member 5; and moving member 7 coupled with nut member 6. As illustrated in FIGS. 1 and 2, drive device 1 further includes coil spring 8 that biases first housing 2 and second housing 3 in a direction in which the housings are separated from each other; and spring guide member 9 that extends in the direction of the axis X (hereinafter also referred to as "axis X direction") of spindle member 5 and between the inner circumference of coil spring 8 and the outer surface of spindle member 5.

Drive device 1 moves second housing 3 relatively with respect to first housing 2 along the extending direction of first housing 2 (in the present embodiment, the axis X direction) by the driving force of drive section 4, thereby operating at least one drive target connected to first housing 2 and/or second housing 3. In the present embodiment, first housing 2 includes first connecting portion C1 to be connected to first base B1 (see FIG. 3), and second housing 3 includes second connecting portion C2 to be connected to second base B2 (see FIG. 3). This configuration allows drive device 1 to be connected to first base B1 and second base B2 via first connecting portion C1 and second connecting portion C2. In the present embodiment, driving of drive device 1 allows for the operation of first base B1 and/or second base B2.

Figure 3:
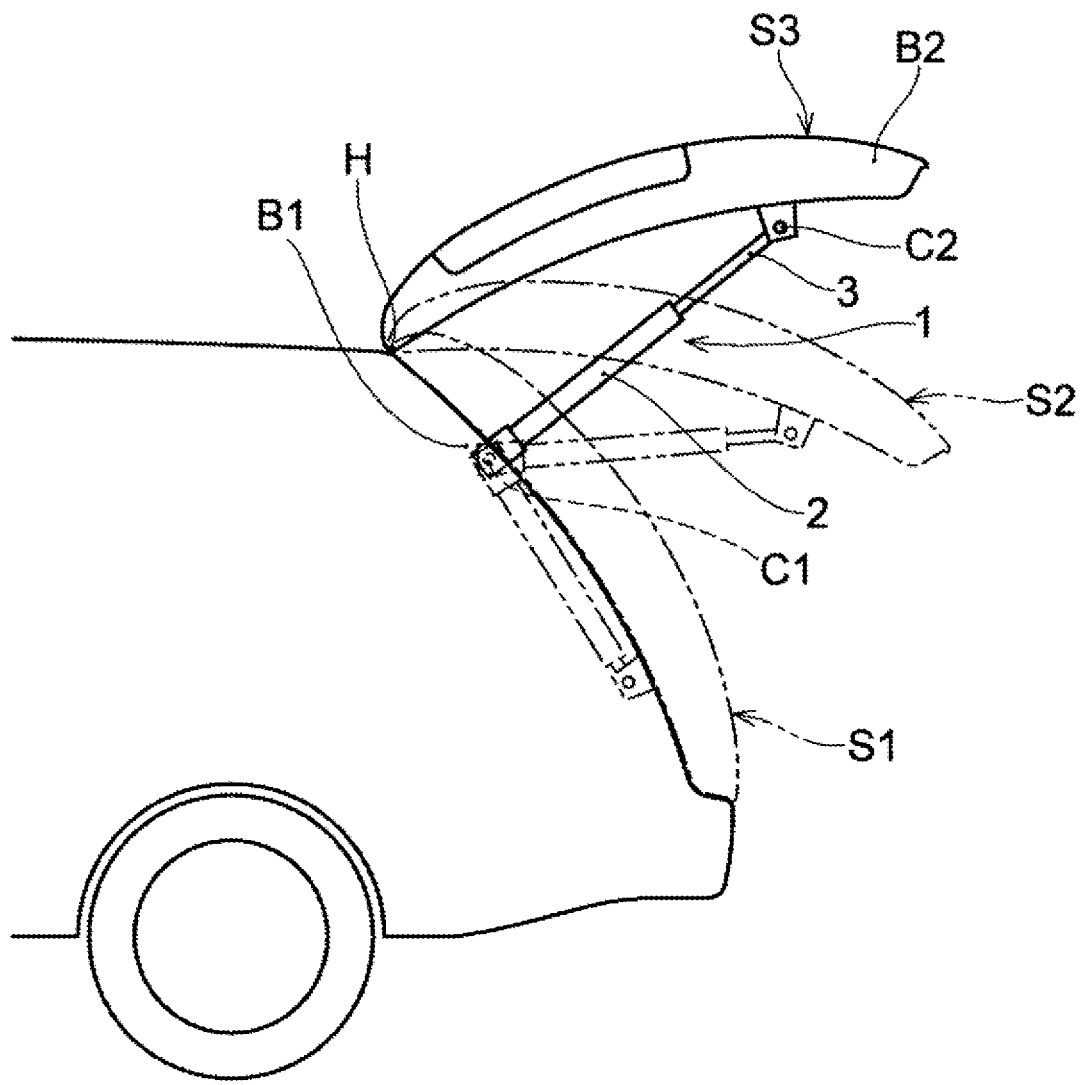
FIG. 3 schematically illustrates a state in which the drive device of FIG. 1 is attached to a vehicle.

In the present embodiment, drive device 1 is applied to an opening/closing device for a back door of a vehicle as illustrated in FIG. 3. In the present embodiment, first base B1 is a vehicle body (hereinafter, also referred to as "vehicle body B1"), and second base B2 is the back door (hereinafter, also referred to as "back door B2") that rotates about hinge H. As illustrated in FIG. 3, when the driving of drive section 4 is performed from a closed state indicated by the reference numeral S1, where back door B2 closes the rear opening of the vehicle, second housing 3 protrudes from first housing 2, and back door B2 starts to open. As the amount of protrusion of second housing 3 from first housing 2 increases, back door B2 moves to an opened state indicated by the reference numeral S3 via a state between the closed state and the opened state (hereinafter simply referred to as "mid-opened state") indicated by the reference numeral S2. From opened state S3 of back door B2, when second housing 3 is moved by drive section 4 so as to be housed in first housing 2, back door B2 moves from opened state S3 to closed state S1.

The present embodiment show an example where drive device 1 is applied to the opening/closing device for back door B2 of the vehicle, but application of drive device 1 is not limited to the back door opening/closing device. For example, drive device 1 may be applied to an opening/closing device for an opening/closing body other than back door B2, a telescopic device performing extension/contraction, and the like.

As illustrated in FIGS. 1 and 2, first housing 2 houses drive section 4. In the present embodiment, first housing 2 together with second housing 3 transmits the driving force of drive section 4 to the drive target. First housing 2 is connected to second housing 3 in such a way that first housing 2 moves relatively with respect to second housing 3. Specifically, first housing 2 is connected to second housing 3 via drive section 4, spindle member 5, nut member 6, and moving member 7. As illustrated in FIGS. 1 and 2, first housing 2 includes inner peripheral surface 21, housing portion 22 housing drive section 4, and protruding portion 23 protruding toward the center of first housing 2 from inner peripheral surface 21. More specifically, first housing 2 includes housing portion 22 on the one end 2a side of first housing 2, cylinder portion 24 on the other end 2b side of first housing 2, and protruding portion 23 between housing portion 22 and cylinder portion 24 in the axis X direction. Housing portion 22 houses drive section 4. Cylinder portion 24 overlaps with second housing 3 in the contracting state of drive device 1 (see FIG. 1). In the present embodiment, housing portion 22, protruding portion 23, and cylinder portion 24 are all integrally formed.

In the present embodiment, first housing 2 is configured as a hollow tubular member having, for example, a cylindrical shape. The material constituting first housing 2 is not limited, but is preferably a metal or resin having a predetermined rigidity. Housing portion 22 is formed in a substantially cylindrical shape having inner peripheral surface 21, and houses drive section 4 in its inside. Cylinder portion 24 is formed in a substantially cylindrical shape having inner peripheral surface 21, and at least partially houses, for example, spindle member 5, nut member 6, moving member 7, coil spring 8, and spring guide member 9. Protruding portion 23 will be described in detail below.

In the present embodiment, first housing 2 is connected to first base B1 by first connecting portion C1 as illustrated in FIG. 3. First base B1 is a vehicle body of a vehicle in the present embodiment. More specifically, first base B1 is the opening edge of the rear opening of the vehicle that is closed by a back door. However, first base B1 is not limited to the vehicle body, and is appropriately changed depending on the target for applying drive device 1 thereto.

First connecting portion C1 is connected to first base B1, and first connecting portion C1 may be connected in such a way that first housing 2 can move relatively with respect to first base B1, such as swinging, or first connecting portion C1 may be fixed so that first connecting portion C1 does not move relatively with respect to first base B1. In the present embodiment, first connecting portion C1 is configured in such a way that first housing 2 swings with respect to first base B1 as illustrated in FIG. 3. The structure used for first connecting portion C1 is not limited, but a known joining structure such as a ball joint, a clevis, a pin joint, or a universal joint can be used for first connecting portion C1.

In the present embodiment, first housing 2 is formed in a substantially cylindrical shape, and includes first connecting portion C1 on the one end 2a side. Inside first housing 2, drive section 4 is provided on one end 2a side, and spindle member 5 connected to drive section 4 extends coaxially with first housing 2 toward the other end 2b of first housing 2. In the present embodiment, drive section 1 includes spring guide member 9 between inner peripheral surface 21 of first housing 2 and the outer circumference of spindle member 5. The inner peripheral surface of spring guide member 9 and the outer circumference of spindle member 5 are separated from each other in the radial direction of spindle member 5. Nut member 6 and moving member 7 are provided between the inner peripheral surface of spring guide member 9 and the outer circumference of spindle member 5. In addition, the outer circumference of spring guide member 9 and inner peripheral surface 21 of first housing 2 are separated from each other in the radial direction of spindle member 5. Between the outer circumference of spring guide member 9 and inner peripheral surface 21 of first housing 2, second housing 3 that telescopically moves in accordance with the movement of moving member 7 in such a way that second housing 3 moves into and out of first housing 2 in a nested manner. In addition to second housing 3, coil spring 8 that assists the movement of second housing 3 is provided between the outer circumference of spring guide member 9 and inner peripheral surface 21 of first housing 2. The shape and structure of drive device 1 are not limited to those illustrated in the drawings. For example, first housing 2 may telescopically move into and out of second housing 3 in a nested manner.

Second housing 3 is moved relatively with respect to first housing 2 in the axis X direction by the driving force of drive section 4. In the present embodiment, second housing 3 together with first housing 2 transmits the driving force of drive section 4 to the drive target. As illustrated in FIGS. 1 and 2, second housing 3 moves in the axis X direction together with moving member 7 as nut member 6 moves with respect to spindle member 5 in the axis X direction.

In the present embodiment, second housing 3 is connected to second base B2 by second connecting portion C2 as illustrated in FIG. 3. Second base B2 is a back door of a vehicle in the present embodiment. However, second base B2 is not limited to the back door, and is appropriately changed depending on the target for applying drive device 1 thereto. Second connecting portion C2 is connected to second base B2, and second connecting portion C2 may be connected in such a way that second housing 3 can move relatively with respect to second base B2, such as swinging, or second connecting portion C2 may be fixed so that second connecting portion C2 does not move relatively with respect to second base B2. In the present embodiment, second connecting portion C2 is configured in such a way that second housing 3 swings with respect to second base B2 as illustrated in FIG. 3. The structure used for second connecting portion C2 is not limited, but a known joining structure such as a ball joint, a clevis, a pin joint, or a universal joint can be used for second connecting portion C2.

In the present embodiment, second housing 3 is formed in a cylindrical shape, and includes second connecting portion C2 on the one end 3a side. The material constituting second housing 3 is not limited, but is preferably a metal or resin having a predetermined rigidity. Moving member 7, nut member 6, and a part of coil spring 8 are provided inside second housing 3. One end 7a of moving member 7 is connected to the one end 3a side of second housing 3, and moving member 7 extends from the one end 3a side toward the other end 3b side of second housing 3. Nut member 6 is provided on the other end 7b side of moving member 7. Nut member 6 is located on the other end 3b side of second housing 3.

Drive section 4 generates a driving force for moving second housing 3 relatively with respect to first housing 2. In the present embodiment, drive section 4 rotates spindle member 5 about the axis X. As a result, nut member 6 moves with respect to spindle member 5 in the axis X direction, and thus moving member 7 and second housing 3 that are coupled with nut member 6 move with respect to spindle member 5 and first housing 2 in the axis X direction. In the present embodiment, drive section 4 includes an electric motor, and is configured to be supplied with power from the outside of first housing 2 to rotate spindle member 5 in the forward and reverse directions.

The shape and structure of drive section 4 are not limited so long as drive section 4 can generate a driving force for moving second housing 3 relatively with respect to first housing 2. In the present embodiment, drive section 4 includes connecting portion 41 with spindle member 5 rotatably connected thereto. Connecting portion 41 includes bearing B that rotatably supports spindle member 5. Further, as will be described below, drive section 4 includes end surface 42 facing spring guide member 9 in the axis X direction.

Spindle member 5 is a rod-shaped member with a male screw formed on the outer circumference thereof. Spindle member 5 is rotated about the axis X by drive section 4, thereby moving nut member 6 screwed with the male screw of spindle member 5 in the axis X direction. In the present embodiment, the one end 5a side of spindle member 5 is inserted through bearing B provided in connecting portion 41 of drive section 4 and is connected to drive section 4, as illustrated in FIGS. 1 and 2. The other end 5b side of spindle member 5 is located inside moving member 7 having a substantially cylindrical shape. Retaining portion 51 for preventing spindle member 5 from coming off nut member 6 is provided at the tip of spindle member 5 on the other end 5b side. In the present embodiment, drive device 1 is configured in such a way that the inner peripheral surface of moving member 7 slides against retaining portion 51 located at the tip of spindle member 5 when spindle member 5 is rotated by drive section 4 to move moving member 7 together with nut member 6 in the axis X direction. When drive device 1 is in the extending state illustrated in FIG. 2, retaining portion 51 engages with engaging portion 71 provided on the other end 7b side of moving member 7 in the axis X direction. This configuration allows prevention of moving member 7 from coming off spindle member 5.

Nut member 6 is a cylindrical body with a female screw formed on the inner circumference thereof. Nut member 6 is configured to move in the axis X direction with a predetermined stroke with respect to spindle member 5 in accordance with the rotation of spindle member 5 about the axis X. Nut member 6 is coupled with moving member 7 and moves together with moving member 7 in the axis X direction with respect to spindle member 5. In the present embodiment, nut member 6 is configured to move inside spring guide member 9 in the axis X direction. In the present embodiment, a rotation regulating portion (not illustrated) regulates the rotation of nut member 6 in the direction about the axis X with respect to spring guide member 9. This configuration prevents nut member 6 from rotating together with spindle member 5, thereby allowing nut member 6 to move inside spring guide member 9 in the axis X direction of spindle member 5 when spindle member 5 rotates about the axis X.

As illustrated in FIGS. 1 and 2, moving member 7 is coupled with nut member 6 and moved in the axis X direction by the movement of nut member 6 in the axis X direction. In the present embodiment, moving member 7 is connected to second housing 3 on the one end 7a side, namely the side opposite to drive section 4 in the axis X direction, and coupled with nut member 6 on the other end 7b side, namely the drive section 4 side. In the present embodiment, when nut member 6 moves toward drive section 4 in the axis X direction, moving member 7 moves so as to be pulled into the inside of first housing 2. On the other hand, when nut member 6 moves away from drive section 4 in the axis X direction, moving member 7 moves so as to protrude from first housing 2. This movement of moving member 7 into and out of first housing 2 causes second housing 3 to move relatively with respect to first housing 2 in the axis X direction. In the present embodiment, the relative movement of second housing 3 with respect to first housing 2 in the axis X direction causes extension and contraction of drive device 1 to drive the drive target connected to moving member 7 via second connecting portion C2 as illustrated in FIG. 3. Second base body B2, such as a back door serves as the drive target.

The shape and structure of moving member 7 are not limited so long as moving member 7 is coupled with nut member 6 and can be moved in the axis X direction by the movement of nut member 6. In the present embodiment, moving member 7 has a substantially cylindrical shape. Specifically, moving member 7 is disposed coaxially with spindle member 5 and is formed in a hollow cylindrical shape having an inner diameter larger than the outer diameter of spindle member 5. When nut member 6 and moving member 7 move toward the drive section 4 side, spindle member 5 is housed inside hollow moving member 7 (see FIG. 1). The method for connecting moving member 7 with nut member 6 is not limited so long as moving member 7 can be moved in the axis X direction by the movement of nut member 6 in the axis X direction. Nut member 6 may be integrally formed with moving member 7, or may be detachably provided.

Coil spring 8 biases first housing 2 and second housing 3 in the axis X direction so that the housings are separated from each other. In the present embodiment, coil spring 8 assists the movement of second housing 3 in the direction away from first housing 2, namely the direction away from drive section 4. When drive device 1 is applied to the opening/closing device for back door B2 of a vehicle, coil spring 8 has a sufficient biasing force for supporting the weight of back door B2 so that back door B2 can be held in opened state S3 (see FIG. 3).

Coil spring 8 has a contracting/extending axis coaxial with the axis X of spindle member 5. As illustrated in FIGS. 1 and 2, one end 8a of coil spring 8, which is on the drive section 4 side in the axis X direction, is attached to protruding portion 23 of first housing 2, and the other end 8b, which is on the side opposite to drive section 4 side in the axis X direction, is attached to one end 3a of second housing 3. Coil spring 8 is compressed in a contracting state, that is, when the total length of drive device 1 decreases (see FIG. 1), and is extended in an extending state, that is, when the total length of drive device 1 increases (see FIG. 2).

Coil spring 8 is disposed inside second housing 3 and outside moving member 7 in a direction perpendicular to the axis X direction. Inside first housing 2, coil spring 8 is disposed between inner peripheral surface 21 of first housing 2 and the outer surface of spring guide member 9.

Figure 4:
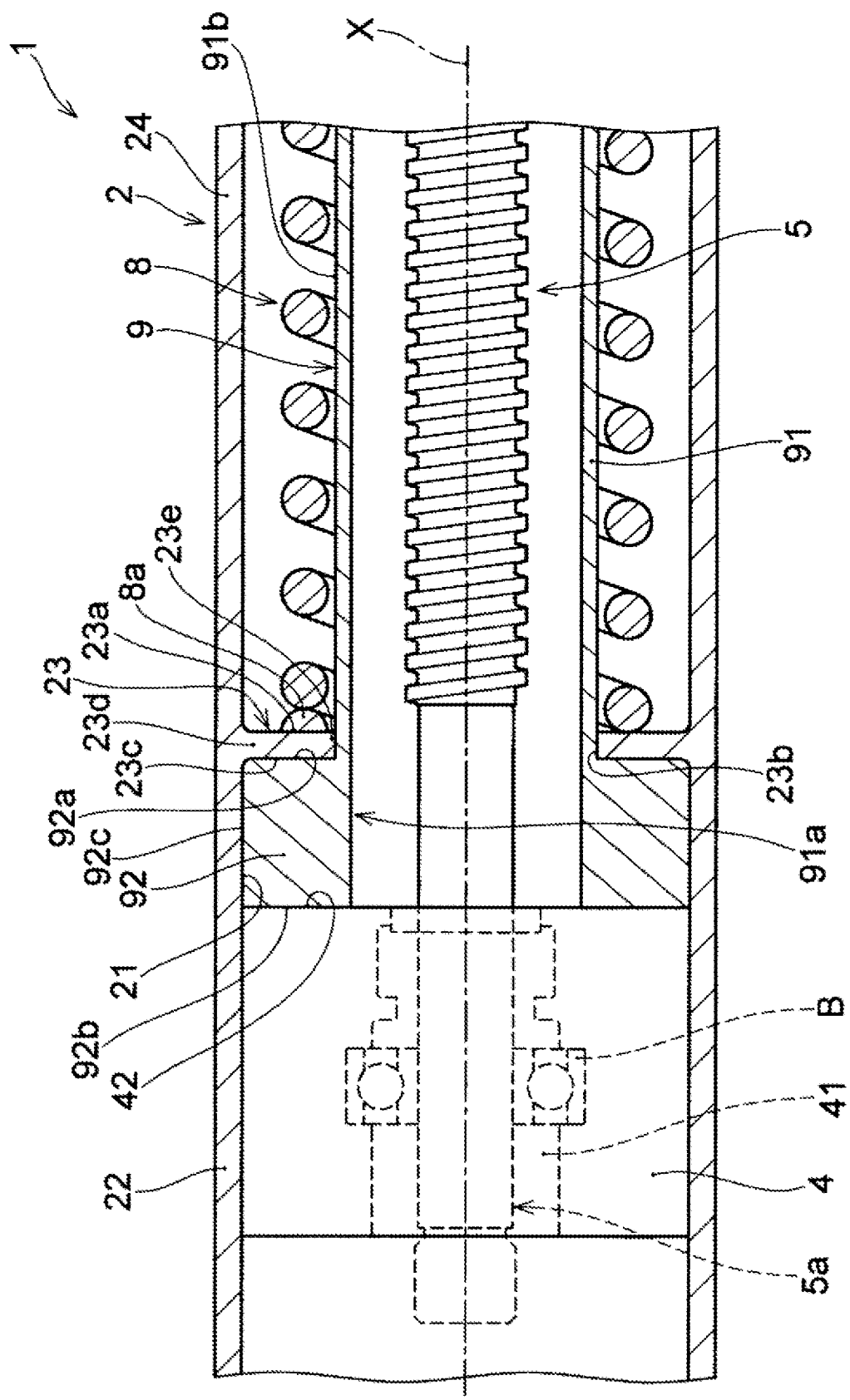
FIG. 4 is an enlarged view of region A in FIG. 2.

Spring guide member 9 guides coil spring 8 along the axis X direction. In the present embodiment, spring guide member 9 guides coil spring 8 in first housing 2 in such a way that coil spring 8 does not come into contact with the outer circumference of spindle member 5. In the present embodiment, spring guide member 9 is attached to first housing 2 so as not to rotate about the axis X, and guides nut member 6 in such a way that nut member 6 is movable in the axis X direction in the inside of spring guide member 9. As illustrated in FIGS. 1, 2 and 4, spring guide member 9 includes spring support portion 91 extending along the axis X direction of spindle member 5 for supporting coil spring 8; and flange portion 92 on the one end 91a side of spring support portion 91. Flange portion 92 protrudes more outward in the radial direction of spring support portion 91 than the outer surface of spring support portion 91. The material constituting spring guide member 9 is not limited, but is preferably a metal or resin having a predetermined rigidity.

Spring support portion 91 is a part that supports coil spring 8 along the axis X direction. Inside coil spring 8 in the radial direction, spring support portion 91 extends in the axis X direction to prevent coil spring 8 from coming into contact with the outer circumference of spindle member 5 in the present embodiment. In the present embodiment, spring support portion 91 is formed in a substantially cylindrical shape. As illustrated in FIGS. 1 and 2, spring support portion 91 is provided so as to entirely cover a region—where the male screw is formed—of spindle member 5 in the axis X direction. The shape and structure of spring support portion 91 are not limited so long as coil spring 8 can be prevented from coming into contact with the outer circumference of spindle member 5.

Flange portion 92 protrudes more outward in the radial direction than outer surface 91b of spring support portion 91 on the one end 91a side of spring support portion 91, where one end 91a side is drive section 4 side in the axis X direction (see FIG. 4). As will be described below, flange portion 92 is held between protruding portion 23 and drive section 4 in the axis X direction of spindle member 5. Thereby, spring guide member 9 is fixed to first housing 2.

In the present embodiment, flange portion 92 includes first contact portion 92a that makes contact on the protruding portion 23 side in the axis X direction and second contact portion 92b that makes contact on the drive section 4 side in the axis X direction, as illustrated in FIG. 4. First contact portion 92a may be in direct contact with protruding portion 23 or indirectly connected to protruding portion 23 in the axial X direction via another member such as a seal member. In addition, second contact portion 92b may be in direct contact with drive section 4 or indirectly connected to drive section 4 in the axial X direction via another member such as a seal member. The shapes and structures of first contact portion 92a and second contact portion 92b are not limited so long as first contact portion 92a and second portion 92b can respectively be in contact with protruding portion 23 and drive section 4 in the axis X direction.

In the following, protruding portion 23 of first housing 2 will be described. As illustrated in FIG. 4, protruding portion 23 of first housing 2 includes support portion 23a that directly or indirectly supports one end 8a of coil spring 8, insertion space 23b located inside in the radial direction, and connecting portion 23c to which flange portion 92 of spring guide member 9 is directly or indirectly connected. Spring support portion 91 of spring guide member 9 is inserted through insertion space 23b. In the present embodiment, protruding portion 23 includes outer end portion 23d connected to inner peripheral surface 21 of first housing 2, and inner end portion 23e forming insertion space 23b through which spring support portion 91 of spring guide member 9 is inserted.

Protruding portion 23 supports one end 8a of coil spring 8, and protruding portion 23 and drive section 4 sandwich flange portion 92 of spring guide member 9 to fix spring guide member 9 to first housing 2. Protruding portion 23 is provided at inner peripheral surface 21 of first housing 2 on the drive section 4 side in the axis X direction. Protruding portion 23 is separated from end surface 42 of drive section 4 in the axis X direction at a distance corresponding to the length of flange portion 92 of spring guide member 9 in the axis X direction.

The shape and structure of protruding portion 23 is not limited so long as protruding portion 23 includes support portion 23a, insertion space 23b, and connecting portion 23c, and protruding portion 23 and drive section 4 can hold flange portion 92 therebetween. In the present embodiment, protruding portion 23 is formed in an annular shape extending along inner peripheral surface 21 of first housing 2. More specifically, protruding portion 23 is formed in a substantially disk shape in which a through hole extending in the axis X direction is formed. In the present embodiment, protruding portion 23 is integrally formed with housing portion 22 and cylinder portion 24 of first housing 2. Protruding portion 23 extends continuously in the circumferential direction of inner peripheral surface 21 of first housing 2, but may be divided in the circumferential direction.

In protruding portion 23, support portion 23a is located on the side opposite to drive section 4 in the axis X direction, and faces one end 8a of coil spring 8. Support portion 23a directly or indirectly supports one end 8a of coil spring 8. In the present embodiment, support portion 23a is in contact with one end 8a of coil spring 8 and directly supports coil spring 8. However, another member such as a seal member may be placed between support portion 23a and one end 8a of coil spring 8, so that support portion 23a indirectly supports one end 8a of coil spring 8.

The shape of support portion 23a is not limited so long as support portion 23a can directly or indirectly support one end 8a of coil spring 8. In the present embodiment, support portion 23a is formed as a surface substantially perpendicular to the axis X.

Insertion space 23b is a space for inserting spring support portion 91 of spring guide member 9 therethrough in the axis X direction. Spring guide member 9 is inserted through insertion space 23b when drive device 1 is assembled. As a result, spring guide member 9 is assembled with first housing 2. In the present embodiment, insertion space 23b is defined by inner end portion 23e of protruding portion 23. The shape and size of insertion space 23b are not limited so long as spring support portion 91 of spring guide member 9 can be inserted through insertion space 23b. The shape and size can be appropriately changed according to the shape and size of protruding portion 23. In the present embodiment, insertion space 23b of protruding portion 23 and spindle member 5 are provided coaxially with each other as illustrated in FIG. 4. In addition, insertion space 23b includes a circular opening having a diameter substantially the same as the outer diameter of outer surface 91b of spring support portion 91 in a cross section perpendicular to the axis X direction. Insertion space 23b may have a size such that insertion space 23b has a gap between outer surface 91b of spring support portion 91 and inner end portion 23e of protruding portion 23.

In protruding portion 23, connecting portion 23c is a part connected to flange portion 92 on the drive section 4 side in the axis X direction. In the present embodiment, connecting portion 23c faces first contact portion 92a of flange portion 92 in the axis X direction, and is directly or indirectly connected to first contact portion 92a. The shape and structure of connecting portion 23c are not limited so long as connecting portion 23c and drive section 4 can hold flange portion 92 therebetween. In the present embodiment, connecting portion 23c includes a contact surface that is in contact with first contact portion 92a. More specifically, connecting portion 23c includes a contact surface substantially perpendicular to the axis X.

As described above, flange portion 92 of spring guide member 9 is held between protruding portion 23 and drive section 4 in the axis X direction of spindle member 5, as illustrated in FIG. 4. This configuration can readily fix spring guide member 9 because flange portion 92 of spring guide member 9 is sandwiched between protruding portion 23 and drive section 4 during the fixing of spring guide member 9 to first housing 2. The fixing of spring guide member 9 is performed by holding flange portion 92 between protruding portion 23 and drive section 4 housed in first housing 2 in the axis X direction. In this configuration, protruding portion 23 protrudes from inner peripheral surface 21 of first housing 2 toward the center (axis X) of first housing 2. Therefore, no fixing member that protrudes from the outer circumference of first housing 2 is required for fixing spring guide member 9, and thus drive device 1 can be kept compact in the radial direction.

In addition, protruding portion 23 includes support portion 23a that supports one end 8a of coil spring 8 and connecting portion 23c that connects to one side of flange portion 92 in the axis X direction when holding flange portion 92 in the present embodiment. In this case, for example, after drive device 1 is assembled, protruding portion 23 receives a force more strongly from coil spring 8 in a direction for holding flange portion 92 via support portion 23a. As a result, a force for holding flange portion 92 is applied more strongly from connecting portion 23c toward flange portion 92, and flange portion 92 is more stably held. The rattling of spring guide member 9, such that spring support portion 91 of spring guide member 9 inclines with respect to the axis X, can be thus prevented. In addition, drive section 4 receives a force from compressed coil spring 8 in the direction in which drive section 4 is pressed toward flange portion 92 in the present embodiment. Specifically, second housing 3 receives a force in the direction in which second housing 3 protrudes from first housing 2 (to the right in FIG. 1) due to the force from compressed coil spring 8 which tends to extend. Drive section 4 is connected to second housing 3 via moving member 7, nut member 6, and the spindle member 5, and thus drive section 4 applies a pressing force toward flange portion 92. Therefore, the restoring force of the compressed coil spring 8 applies forces in the direction in which flange portion 92 is sandwiched from both drive section portion 4 and protruding portion 23 in the present embodiment. As a result, flange portion 92 is even more stably held.

Further, protruding portion 23 receives a force toward the drive section 4 side due to the biasing force of coil spring 8, but in the present embodiment, the biasing force applied to protruding portion 23 is supported by flange portion 92 and drive section 4. Thus, even if protruding portion 23 is formed in the shape of a thin plate in the axis X direction, the deformation of protruding portion 23 can be reduced, and supporting coil spring 8 can be stably supported.

As illustrated in FIG. 4, in spring guide member 9, outer surface 91b of spring support portion 91 is supported by inner end portion 23e in the present embodiment. In this case, even if spring support portion 91 of spring guide member 9 receives a force that causes spring support portion 91 to incline with respect to the axis X, outer surface 91b of spring support portion 91 comes into contact with inner end portion 23e of protruding portion 23. This configuration prevents spring support portion 91 of spring guide member 9 from inclining with respect to the axis X.

In the present embodiment, protruding portion 23 is formed in an annular shape along inner peripheral surface 21 of first housing 2, and flange portion 92 is formed in a substantially cylindrical shape that allows flange portion 92 to contact connecting portion 23c of protruding portion 23 for a predetermined length of flange portion 92 in the radial direction. In this case, protruding portion 23 having an annular shape and flange portion 92 having a substantially cylindrical shape are in contact with each other in the axis X direction, so that protruding portion 23 comes into contact with flange portion 92 in an annular contact region. This configuration allows protruding portion 23 and drive section 4 to hold flange portion 92 therebetween more stably.

Further, in the present embodiment, connecting portion 23c of protruding portion 23 and flange portion 92 of spring guide member 9 are provided substantially perpendicular to the axis X direction, and spring guide member 9 is substantially coaxial with spindle member 5 due to flange portion 92 being held between protruding portion 23 and drive section 4. In this case, since connecting portion 23c and flange portion 92 are both provided substantially perpendicular to the axis X direction, the central axis of spring guide member 9 extends so as to coincide with the axis X of spindle member 5 when flange portion 92 is connected to connecting portion 23c. This configuration allows for further prevention of inclining of spring guide member 9 (spring support portion 91 in the present embodiment) with respect to the axis X of spindle member 5. In the present embodiment, connecting portion 23c has a surface substantially perpendicular to the axis X, and first contact portion 92a connected to connecting portion 23c also has a surface substantially perpendicular to the axis X. This case allows connecting portion 23c and first contact portion 92a to be connected by the surfaces, thereby making the fixing of spring guide member 9 stronger. In the present embodiment, second contact portion 92b has a surface substantially perpendicular to the axis X, and end surface 42 of drive section 4 has a surface substantially perpendicular to the axis X. In this case, flange portion 92 is connected to protruding portion 23 and drive section 4 by the surfaces on both sides in the axis X direction, thereby disposing spring guide member 9 more accurately and stably in such a way that spring guide member 9 coincides with the axis X of spindle member 5. Configuring nut member 6 to move in the axis X direction with respect to spring guide member 9 as in the present embodiment allows for smooth movement of nut member 6 in the axis X direction.

Further, flange portion 92 includes outer peripheral surface 92c facing inner peripheral surface 21 of first housing 2. In the present embodiment, outer peripheral surface 92c is configured to contact inner peripheral surface 21 of first housing 2 for a predetermined length in the axis X direction. In this case, inner peripheral surface 21 of first housing 2 and outer peripheral surface 92c of flange portion 92 come into surface contact with each other for a predetermined length in the axial X direction, so that the movement of spring guide member 9 to be inclined relative to the axial X is more restricted. The predetermined length of flange portion 92 in the axis X direction is not limited, but may be, for example, twice or more, preferably three times or more the thickness of protruding portion 23 in the axis X direction.

REFERENCE SIGNS LIST

1 Drive device
2 First housing
2a One end of first housing
2b The other end of first housing
21 Inner peripheral surface
22 Housing portion
23 Protruding portion
23a Support portion
23b Insertion space
23c Connecting portion
23d Outer end portion
23e Inner end portion
24 Cylinder portion
3 Second housing
3a One end of second housing
3b The other end of second housing
4 Drive section
41 Connecting portion
42 End surface
5 Spindle member
5a One end of spindle member
5b The other end of spindle member
51 Retaining portion
6 Nut member
7 Moving member
7a One end of moving member
7b The other end of moving member
71 Engaging portion of moving member
8 Coil spring
8a One end of coil spring
8b The other end of coil spring
9 Spring guide member
91 Spring support portion
91a One end of spring support portion
91b Outer surface of spring support portion
92 Flange portion
92a First contact portion
92b Second contact portion
92c Outer peripheral surface of flange portion
B Bearing
B1 First base (vehicle body)
B2 Second base (back door)
C1 First connecting portion
C2 Second connecting portion
H Hinge
S1 Closed state
S2 Mid-opened state
S3 Opened state
X Axis of spindle member

The invention claimed is:

1. A drive device, comprising:
a first housing which is a cylindrical body provided with a protruding portion protruding radially toward a center of the cylindrical body from an inner peripheral surface of the cylindrical body at an intermediate position in an extending direction of the cylindrical body, the cylindrical body including a housing portion and a cylinder portion provided at one side and another side respectively with respect to the protruding portion in the extending direction, the housing portion, the cylinder portion and the protruding portion being all integrally formed;
a second housing housed in the cylinder portion and configured to move relatively with respect to the first housing along the extending direction such that an amount of protrusion from the cylinder portion is changed;
a drive section provided in the first housing and housed in the housing portion;
a spindle member to be rotated by driving of the drive section;
a nut member screwed with the spindle member;
a moving member coupled with the nut member;
a coil spring configured to bias the first housing and the second housing in a direction in which the first housing and the second housing are separated from each other; and
a spring guide member extending in an axis direction of the spindle member and between an inner circumference of the coil spring and an outer surface of the spindle member,
wherein the spring guide member includes a spring support portion extending along the axis direction to support the coil spring, and a flange portion on a side of one end of the spring support portion, the flange portion protruding more outward in a radial direction of the spring support portion than an outer surface of the spring support portion,
the protruding portion of the first housing includes a support portion that directly or indirectly supports one end of the coil spring, an insertion space located inside in the radial direction, and a spring guide connecting portion to which the flange portion of the spring guide member is directly or indirectly connected, the insertion space being a space through which the spring support portion of the spring guide member is placed, an outer peripheral part of the flange portion of the spring guide member is disposed to abut on the inner peripheral surface which encircles the outer peripheral part and abut on both the spring guide connecting portion of the protruding portion and an end surface of the drive section which sandwich the outer peripheral part in the axis direction; and an axial length of the outer peripheral part of the flange portion of the spring guide member is longer than a coil pitch of the coil spring when the drive device is in an extending state.

2. The drive device according to claim 1, wherein:

the protruding portion includes an outer end portion connected to the inner peripheral surface of the first housing, and an inner end portion that forms the insertion space through which the spring support portion of the spring guide member is placed; and in the spring guide member, the outer surface of the spring support portion is supported by the inner end portion.

3. The drive device according to claim 1, wherein:

the protruding portion is formed in an annular shape extending along the inner peripheral surface of the first housing; and the flange portion is formed in a substantially cylindrical shape, the substantially cylindrical shape allowing the flange portion to contact the spring guide connecting portion of the protruding portion for a predetermined length of the flange portion in the radial direction.

4. The drive device according to claim 1, wherein:

the insertion space of the protruding portion and the spindle member are provided coaxially with each other;

the spring guide connecting portion of the protruding portion and the flange portion of the spring guide member are provided substantially perpendicular to the axis direction; and the spring guide member is substantially coaxial with the spindle member due to the flange portion sandwiched between the protruding portion and the drive section.

* * * * *